(12) United States Patent
Sachdev et al.

(10) Patent No.: US 11,769,884 B2
(45) Date of Patent: Sep. 26, 2023

(54) ELECTRODE STRUCTURE FOR A BATTERY AND METHOD OF MANUFACTURING THE SAME

(71) Applicant: GM GLOBAL TECHNOLOGY OPERATIONS LLC, Detroit, MI (US)

(72) Inventors: Anil K. Sachdev, Rochester Hills, MI (US); Thomas E. Moylan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 17/586,042

(22) Filed: Jan. 27, 2022

(65) Prior Publication Data

US 2023/0238541 A1 Jul. 27, 2023

(51) Int. Cl.
*H01M 4/74* (2006.01)
*H01M 4/66* (2006.01)
*H01M 4/04* (2006.01)

(52) U.S. Cl.
CPC ......... *H01M 4/742* (2013.01); *H01M 4/0419* (2013.01); *H01M 4/0435* (2013.01); *H01M 4/669* (2013.01)

(58) Field of Classification Search
CPC ...... H01M 4/742; H01M 4/661; H01M 4/669; H01M 4/70; H01M 4/74; H01M 4/134
See application file for complete search history.

(56) References Cited

U.S. PATENT DOCUMENTS

| | | | |
|---|---|---|---|
| 2010/0027193 A1* | 2/2010 | Marumo | H01G 11/50 429/231.95 |
| 2017/0040605 A1* | 2/2017 | Hwang | H01M 4/525 |
| 2018/0034038 A1* | 2/2018 | Rogren | H01M 4/0471 |
| 2020/0020954 A1* | 1/2020 | Sohn | H01M 4/742 |
| 2021/0234190 A1* | 7/2021 | Komatsubara | H01M 4/133 |
| 2022/0376266 A1* | 11/2022 | Hong | H01M 4/5815 |

FOREIGN PATENT DOCUMENTS

CN 112467083 A * 3/2021 ........ H01M 10/4235

\* cited by examiner

*Primary Examiner* — Imran Akram
(74) *Attorney, Agent, or Firm* — Quinn IP Law

(57) ABSTRACT

An electrode structure for a battery includes a middle layer made of an electrically conductive perforated mesh having a top surface, a bottom surface, a plurality of interconnected electrically conductive segments and a plurality of perforations among adjacent ones of the interconnected segments. A top layer of an electrode material is disposed on the top surface, and a bottom layer of the electrode material is disposed on the bottom surface, such that the top and bottom layers are disposed in physical contact with each other through the perforations in the middle layer. A method of manufacturing the electrode structure includes providing the layer of perforated mesh, applying the top and bottom layers of electrode material to the top and bottom surfaces, and curing the top and bottom layers of electrode material using one or more of heat, electromagnetic radiation and convection to produce a layer of cured electrode structure.

19 Claims, 7 Drawing Sheets

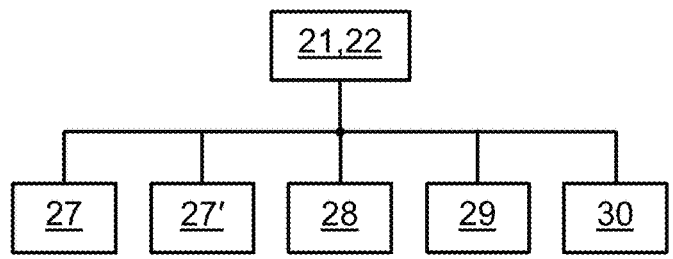
FIG. 11
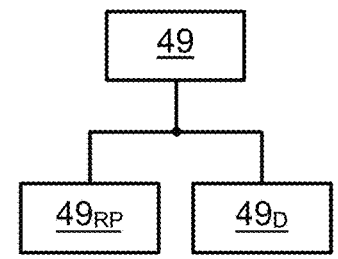
FIG. 12
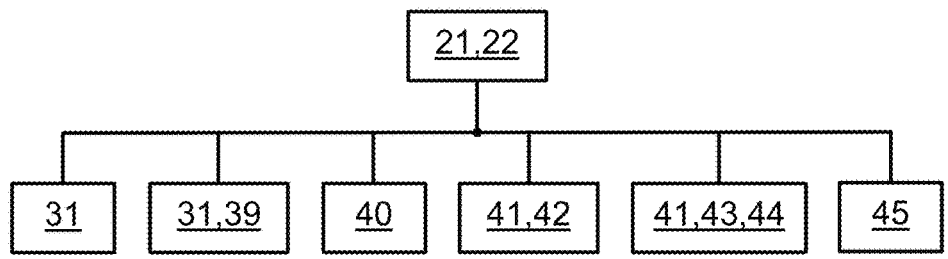
FIG. 13
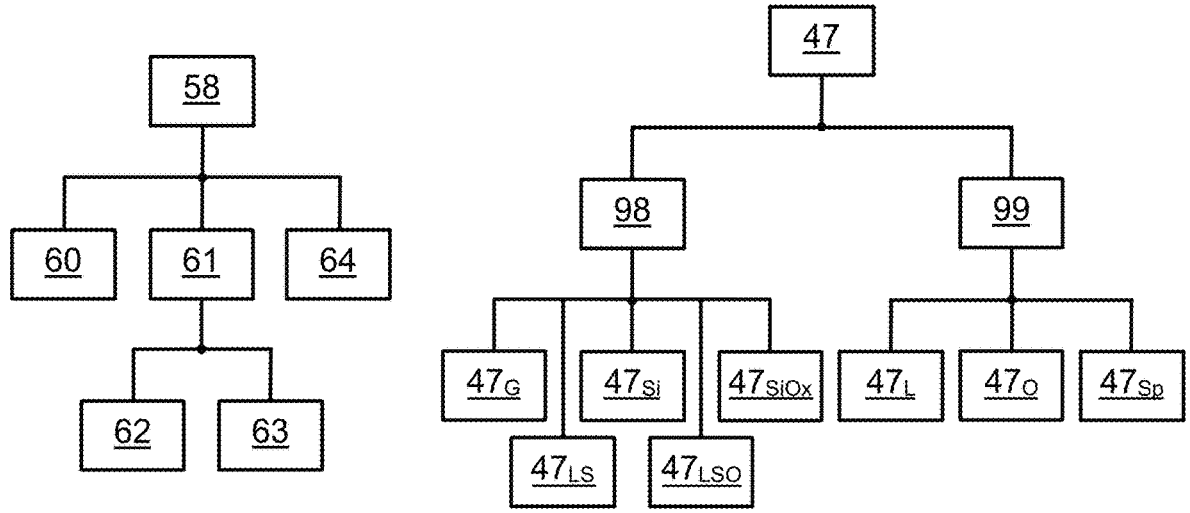
FIG. 14
FIG. 15

ELECTRODE STRUCTURE FOR A BATTERY AND METHOD OF MANUFACTURING THE SAME

INTRODUCTION

This disclosure relates to electrode structures for batteries, such as anodes and cathodes, and to methods of manufacturing electrode structures.

Electrochemical batteries have two electrodes, one described as an anode and the other as a cathode. The anode is the negative or reducing electrode that releases electrons to an external circuit and oxidizes during the electrochemical reaction, while the cathode is the positive or oxidizing electrode that acquires electrons from the external circuit and is reduced during the galvanic reaction.

Customary approaches for manufacturing an electrode (i.e., an anode or a cathode) include depositing an electrode material, sometimes called an "active material", on either side of a solid metallic sheet or foil.

SUMMARY

According to one embodiment, an electrode structure for a battery includes a middle layer of an electrically conductive perforated mesh having a top surface, a bottom surface, a plurality of interconnected electrically conductive segments and a plurality of perforations among adjacent ones of the interconnected electrically conductive segments. A top layer of an electrode material is disposed on the top surface, and a bottom layer of the electrode material is disposed on the bottom surface, wherein the top and bottom layers are disposed in physical contact with each other through the plurality of perforations in the middle layer.

The electrically conductive perforated mesh may be made of steel, stainless steel, copper, aluminum or titanium, and the electrode material may be a cured initially thixotropic slurry or paste. (As used herein, "initially thixotropic" means that in the initial uncured or "wet" slurry or paste form, the electrode material 47 is thixotropic. However, note that after the electrode material 47 has been cured and is in "dry" form (i.e., no longer a "wet" slurry or paste), the electrode material 47 may no longer be thixotropic.) The electrode structure may form an anode or a cathode. If the electrode structure forms an anode, then the electrode material may contain one or more of graphite, silicon, silicon oxide, lithiated silicon and lithiated silicon oxide, but if the electrode structure forms a cathode, then the electrode material may contain one or more of a layered transition metal oxide, an olivine and a spinel. The perforated mesh may be between 10 and 500 microns in thickness, and each of the top and bottom layers of electrode material may be between 40 and 200 microns in thickness if the electrode structure is formed as an anode and between 100 and 400 microns in thickness if the electrode structure is formed as a cathode.

The top and bottom layers of electrode material may form a bounded shape and at least one portion of the middle layer of perforated mesh may extend outside the bounded shape. Alternatively, the middle layer of perforated mesh may not extend outside the bounded shape. In either case, the bounded shape may be a generally flat rectangular prism or a generally flat disc.

The perforated mesh may be: (i) a wire mesh formed of a first set of first wires extending in a first direction and a second set of second wires extending in a second direction that is generally perpendicular to the first direction, such that a plurality of intersections is formed where respective first and second wires cross each other; (ii) the wire mesh just described but wherein the respective first and second wires at each intersection are welded to each other; (iii) a network of expanded metal; (iv) a 3D-printed mesh made of an electrically conductive first material; (v) a 3D-printed mesh of an electrically non-conductive material onto which an electrically conductive second material has been electrodeposited; or (vi) a perforated metallic sheet.

According to another embodiment, a battery electrode includes: (i) a middle layer made of an electrically conductive perforated mesh having a top surface, a bottom surface, a plurality of interconnected electrically conductive segments and a plurality of perforations among adjacent ones of the interconnected electrically conductive segments, wherein the perforated mesh is made of steel, stainless steel, copper, aluminum or titanium; (ii) a top layer of an electrode material disposed on the top surface, wherein the electrode material is a cured initially thixotropic slurry or paste containing one or more of graphite, silicon, silicon oxide, lithiated silicon and lithiated silicon oxide, if the battery electrode is formed as an anode, or at least one of a layered transition metal oxide, an olivine and a spinel if the battery electrode is formed as a cathode; and (iii) a bottom layer of the electrode material disposed on the bottom surface. In this configuration, the top and bottom layers are disposed in physical contact with each other through the plurality of perforations in the middle layer.

According to yet another embodiment, a method of manufacturing an electrode structure for a battery includes: (i) providing a layer of electrically conductive perforated mesh having a top surface, a bottom surface, a plurality of interconnected electrically conductive segments and a plurality of perforations among adjacent ones of the interconnected electrically conductive segments; (ii) applying a top layer and a bottom layer of electrode material to the top and bottom surfaces, respectively, such that the top and bottom layers are in physical contact with each other through the plurality of perforations in the layer of perforated mesh; and (iii) curing the top and bottom layers of electrode material using one or more of heat, electromagnetic radiation and convection to produce a sheet of cured electrode structure, wherein the electromagnetic radiation may include one or more of infrared radiation and ultraviolet radiation.

In this method, the top and bottom layers of electrode material may be applied generally simultaneously as a single step. The electrode material may be applied to only one of the top and bottom surfaces to form the respective top or bottom layer, and the electrode material may flow through the perforations to the other of the top and bottom surfaces to form the respective bottom or top layer.

The electrode material may be applied to the layer of perforated mesh as a slurry or paste which is either sprayed or expressed onto the layer of perforated mesh by one or more dispensers facing one or both of the top and bottom surfaces, or transferred onto the layer of perforated mesh by a first decal transfer backing facing the top surface and a second decal transfer backing facing the bottom surface.

The method may further include spreading the electrode material on at least one of the top and bottom surfaces so as to achieve a predetermined thickness of the electrode material on the at least one of the top and bottom surfaces. Also, the layer of perforated mesh may be disposed in either a horizontal orientation or a vertical orientation for the applying and curing steps. The method may further include cutting the sheet of cured electrode structure into predetermined sized cut sheets, or rolling the sheet of cured electrode structure into a coil.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 11 is a block diagram of metals which may be used for the perforated mesh.

FIG. 12 is a block diagram of bounded shapes into which the top and bottom layers of electrode material may be shaped.

FIG. 13 is a block diagram of possible construction configurations for the perforated mesh.

FIG. 14 is a block diagram of possible energies or approaches for curing the electrode material.

FIG. 15 is a block diagram of possible material formulations that may be used, depending on whether the electrode structure forms an anode or a cathode.

DETAILED DESCRIPTION

Figure 1:
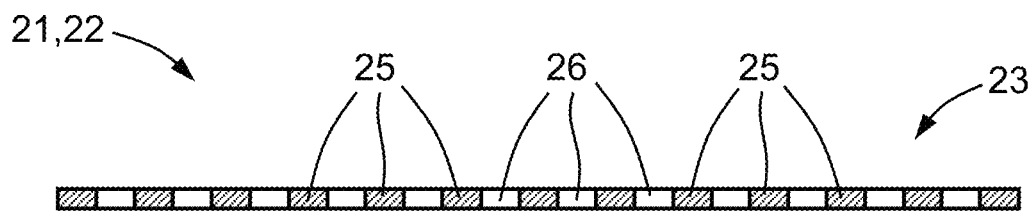
FIG. 1 is a schematic cross-sectional view of a perforated mesh.

Referring now to the drawings, wherein like numerals indicate like parts in the several views, an electrode structure 20 for a battery, and a method 100 for manufacturing the electrode structure 20, are shown and described herein.

While customary approaches for manufacturing an electrode include depositing electrode material (i.e., "active material") on both sides of an electrically conductive sheet or foil, thereby providing top and bottom layers which are physically isolated from each other, the structures and methods of the present disclosure offer the benefit of using a perforated mesh 22 having a plurality of perforations or holes 26 therethrough, so that the electrode material 47 deposited on both sides of the perforated mesh 22 may be in physical contact with each other through the perforations 26.

Figure 2:
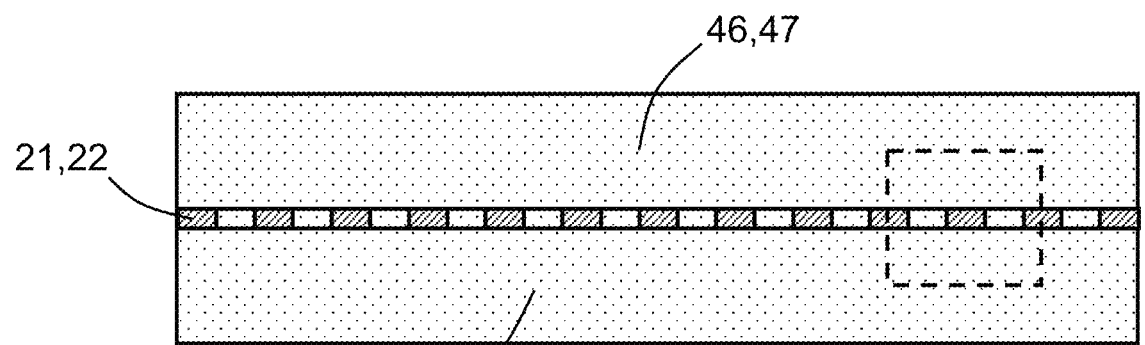
FIG. 2 is a schematic cross-sectional view of an electrode structure which utilizes the perforated mesh and top and bottom layers of electrode material.
Figure 3:
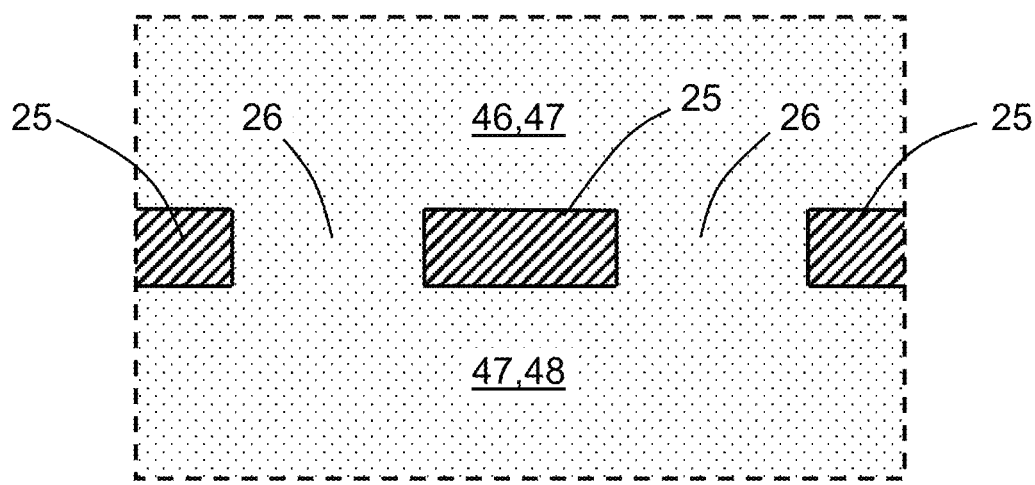
FIG. 3 is a close-up view of the electrode structure within the dashed rectangle of FIG. 2.

FIGS. 1-5 show an electrode structure 20 for use in a battery according to the teachings of the present disclosure. Referring to FIG. 1, the electrode structure 20 includes a middle layer 21 consisting of an electrically conductive perforated mesh 22 having a top surface 23, a bottom surface 24, a plurality of interconnected electrically conductive segments 25 and a plurality of perforations 26 between or among adjacent ones of the interconnected electrically conductive segments 25. Referring to FIGS. 2-3, a top layer 46 of an electrode material 47 is disposed on the top surface 23 of the perforated mesh 22, and a bottom layer 48 of the electrode material 47 is disposed on the bottom surface 24 of the perforated mesh 22. As more clearly shown in FIG. 3, the top and bottom layers 46, 48 of electrode material 47 are disposed in physical contact with each other through the plurality of perforations 26 in the perforated mesh 22 of the middle layer 21.

As illustrated in FIG. 11, the perforated mesh 22 of the middle layer 21 may be made of steel 27, stainless steel 27', copper 28, aluminum 29 or titanium 30, and may be between 10 and 500 microns in thickness. The electrode structure 20 may form an anode 98 or a cathode 99, depending on the electrode material(s) 47 that are used. The electrode material 47 may be a cured initially thixotropic slurry or paste, and each of the top and bottom layers 23, 24 of electrode material 47 may be between 40 and 200 microns in thickness if the electrode structure 20 is formed as an anode 98, and between 100 and 400 microns in thickness if the electrode structure 20 is formed as a cathode 99. As further elucidated by FIG. 15, if the electrode structure 20 forms an anode 98, then the electrode material 47 may contain graphite $47_G$, silicon $47_{Si}$, silicon oxide $47_{SiOx}$, lithiated silicon $47_{LS}$ and/or lithiated silicon oxide $47_{LSO}$, but if the electrode structure 20 forms a cathode 99, then the electrode material 47 may contain one or more layered transition metal oxides $47_L$, one or more olivines $47_O$, and/or one or more spinels $47_{Sp}$. For example, layered transition metal oxides $47_L$ may include lithium nickel cobalt manganese oxides (Li[Ni$_x$Co$_y$Mn$_z$]O$_2$, or "NCM"), lithium nickel cobalt manganese aluminum oxides (Li[Ni$_x$Co$_y$Mn$_z$Al$_w$]O$_2$, or "NCMA"), lithium nickel cobalt aluminum oxides (LiNiCoAlO$_2$, or "NCA") and lithium cobalt oxide (LiCoO$_2$, or "LCO"). Olivines $47_O$ may include lithium iron phosphate (LiFePO$_4$ or LiFePO$_4$/C, also known as "LFP") and lithium manganese iron phosphate (LiMn$_x$Fe$_{1-x}$PO$_4$, or "LMFP"), and spinels $47_{Sp}$ may include lithium manganese oxides (LiMn$_2$O$_4$, or "LMO") and lithium nickel manganese oxides (LiNi$_{0.5}$Mn$_{1.5}$O$_4$, or "LMNO").

It may be noted that in customary fuel cells or batteries which utilize the abovementioned electrode materials 47 (i.e., active materials), voltage is imposed between the electrodes when charging the cell/battery to drive lithium ions from the cathode to the anode, and the voltage of the cell/battery is imposed on an external load when the cell/battery is discharged. Similarly, it may be understood that the electrode materials 47 allow lithium ions to become accepted or released depending upon the voltage difference between the electrodes. Or, stated another way, the electrode materials 47 allow lithium ions to become accepted or released depending upon the magnitude and sign of the voltage difference between the electrodes, or the electrode materials 47 allow lithium ions to become accepted or released during discharging to a load or charging the cell/battery.

Figure 4:
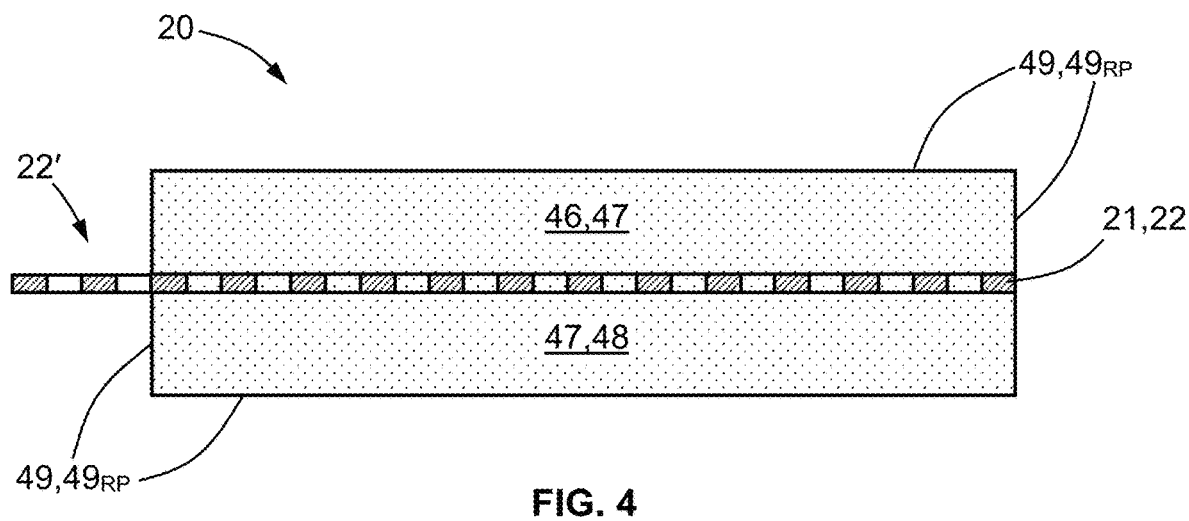
FIG. 4 is a schematic cross-sectional view of an electrode structure in which the perforated mesh extends outward beyond a bounded shape of the top and bottom layers.
Figure 5:
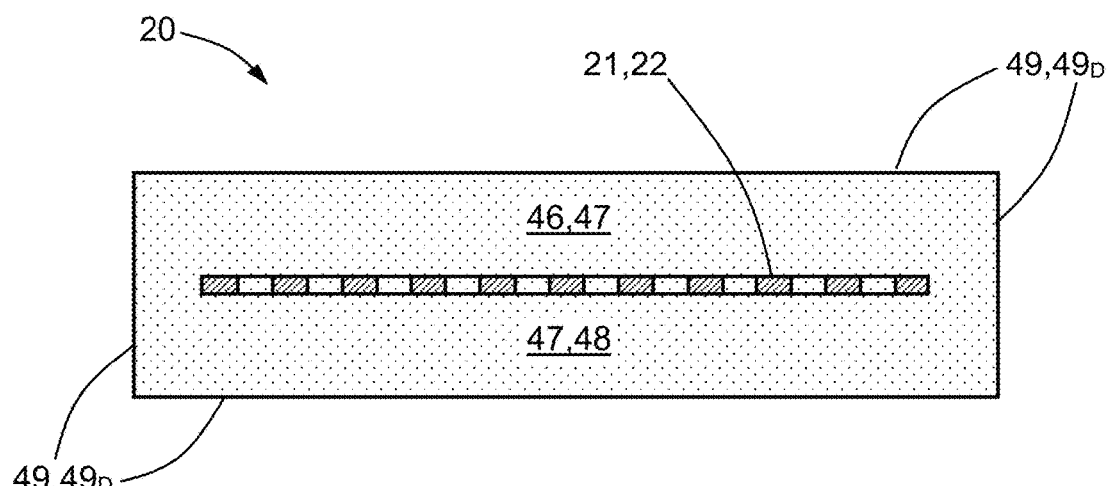
FIG. 5 is a schematic cross-sectional view of an electrode structure in which the perforated mesh is embedded within a bounded shape of the top and bottom layers.

As indicated by FIGS. 4, 5 and 12, the top and bottom layers 23, 24 of electrode material 47 may form a bounded shape 49 (i.e., a three-dimensional ("3D") boundary or envelope), such as a generally flat rectangular prism $49_{RP}$ or a generally flat disc $49_D$. Referring to FIG. 4, in some configurations at least one portion or extension 22' of the middle layer 21 of perforated mesh 22 may extend outside the bounded shape 49 (e.g., for electrical connection with an external circuit). This portion or extension 22' of the perforated mesh 22 may itself be perforated, or it may be non-perforated. Alternatively, as illustrated by FIG. 5, the middle layer 21 of perforated mesh 22 may not extend outside the bounded shape 49, and may be fully encapsulated within the bounded shape 49. In this fully encapsulated configuration, the electrode structure 20 may optionally include one or more wires or electrical leads or a thin sheet extending into the electrode material 47 from outside the electrode structure 20, with the one or more wires or leads being connected to the perforated mesh 22 or being contiguous with the mesh 22 or other forms of the current collector.

Figure 6:
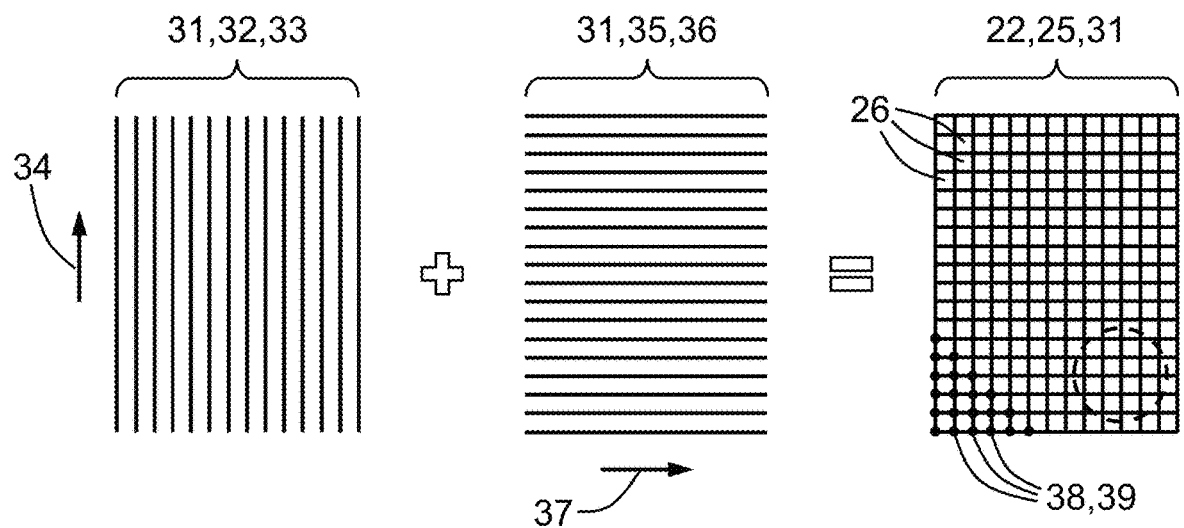
FIG. 6 is a schematic plan view of first and second sets of metallic wires which may be used to form the perforated mesh.

As shown in FIG. 13, the perforated mesh 22 may be provided in a variety of shapes and constructions. For example, as illustrated by FIG. 6, the perforated mesh 22 may be a wire mesh 31 formed by a multiplicity of interconnected metallic wires 33, 36. As shown, the wire mesh 31 may include a first set 32 of first wires 33 extending in a first direction 34, and a second set 35 of second wires 36 extending in a second direction 37 that is generally perpendicular to the first direction 34, such that a plurality of intersections 38 is formed where respective first and second wires 33, 36 cross each other. In such an arrangement, the first and second wires 33, 36 may be interwoven with each other. In another configuration, a similar wire mesh 31 may be provided, but with the respective first and second wires 33, 36 at each intersection 38 being welded to each other (as shown by the weldments 39 represented by dots at selected intersections 38 in the lower-left corner of the drawing at the far right of FIG. 6). In yet another configuration, the perforated mesh 22 may be formed by a network 40 of expanded metal. In a further configuration, the perforated mesh 22 may be a 3D-printed mesh 41 made of an electrically conductive first material 42, and in a related configuration the perforated mesh 22 may be a 3D-printed mesh 41 of an electrically non-conductive material 43 onto which an electrically conductive second material 44 has been electrodeposited. And in a further configuration, the perforated mesh 22 may be formed as a perforated metallic sheet 45 (e.g., a metallic sheet which has been perforated by a laser beam or other perforating/puncturing method). In some configurations or constructions, the perforations 26 may be generally rectangular, while in other configurations or constructions the perforations 26 may be generally circular or have other shapes. However, in all configurations or constructions, the perforations 26 should extend through the entire thickness of the perforated mesh 22, so that the electrode material 47 of the top and bottom layers 46, 48 can extend through the perforations 26, thereby placing the top and bottom layers 46, 48 in physical contact with each other.

Figure 7:
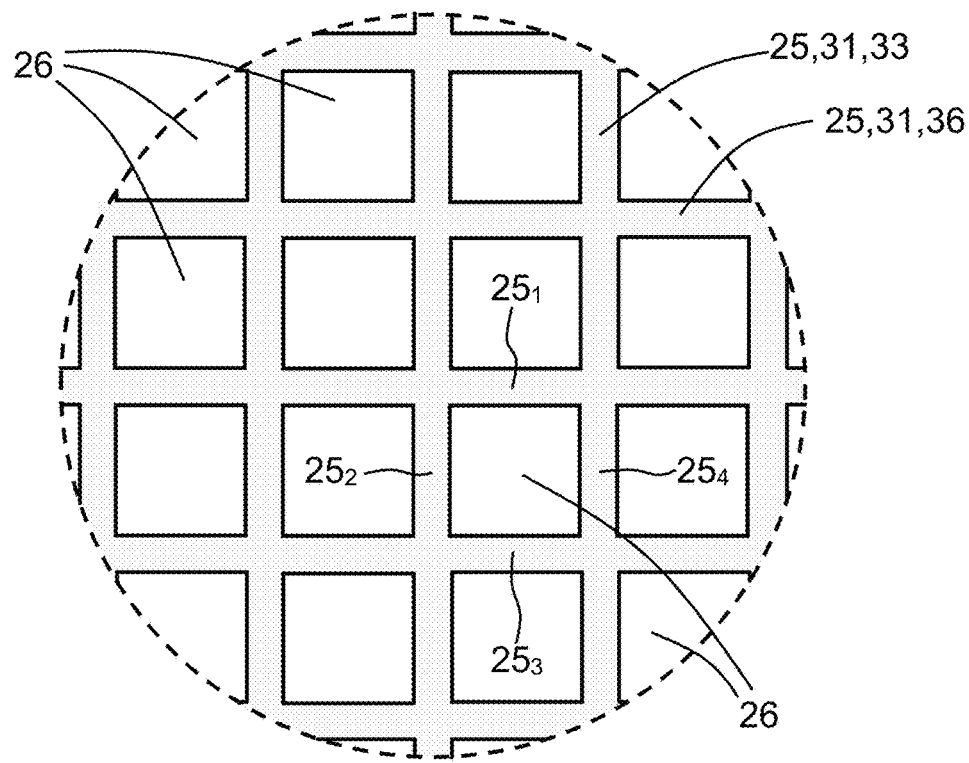
FIG. 7 is a close-up view of the perforated mesh within the dashed circle of FIG. 6.

FIG. 7 shows a close-up view of the lower-right portion of the wire mesh 31 of FIG. 6 that is enclosed by the dashed circle. This view shows the interconnected electrically conductive segments 25 that are spaced apart from each other so as to provide the plurality of perforations 26. For example, note that segments $25_1$, $25_2$, $25_3$ and $25_4$ define a square-shaped perforation 26 among or in the midst of the four segments $25_1$, $25_2$, $25_3$ and $25_4$. Note also that the construction of FIG. 7 may also apply to others of the abovementioned configurations or constructions besides that of the wire mesh 31.

According to another embodiment, a battery electrode 20 includes: (i) a middle layer 21 made of an electrically conductive perforated mesh 22 having a top surface 23, a bottom surface 24, a plurality of interconnected electrically conductive segments 25 and a plurality of perforations 26 among adjacent ones of the interconnected electrically conductive segments 25, wherein the perforated mesh 22 is made of steel 27, stainless steel 27', copper 28, aluminum 29 or titanium 30; (ii) a top layer 46 of an electrode material 47 disposed on the top surface 23, wherein the electrode material 47 is a cured initially thixotropic slurry or paste containing graphite $47_G$, silicon $47_{Si}$, silicon oxide $47_{SiOx}$, lithiated silicon $47_{LS}$ and/or lithiated silicon oxide $47_{LSO}$ if the battery electrode 20 is formed as an anode 98, or one or more layered transition metal oxides $47_L$, one or more olivines $47_O$ and/or one or more spinels $47_{Sp}$ if the battery electrode 20 is formed as a cathode 99; and (iii) a bottom layer 48 of the electrode material 47 disposed on the bottom surface 24. In this configuration, the top and bottom layers 46, 48 are disposed in physical contact with each other through the plurality of perforations 26 in the middle layer 21.

Figure 8:
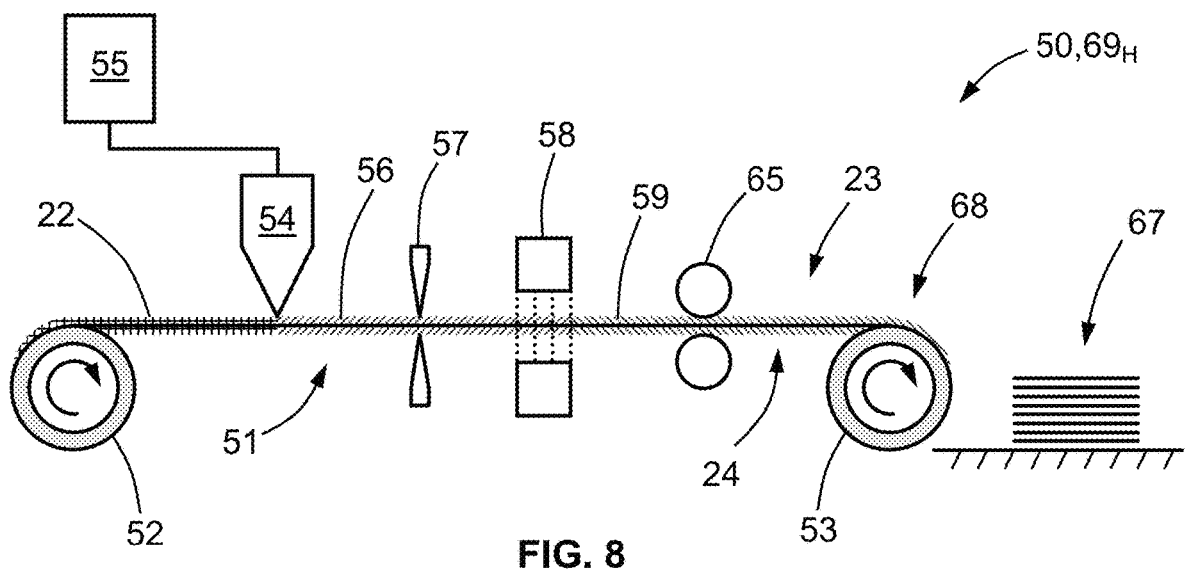
FIG. 8 is a schematic perspective view of a first system for manufacturing an electrode structure in a horizontal orientation.
Figure 9:
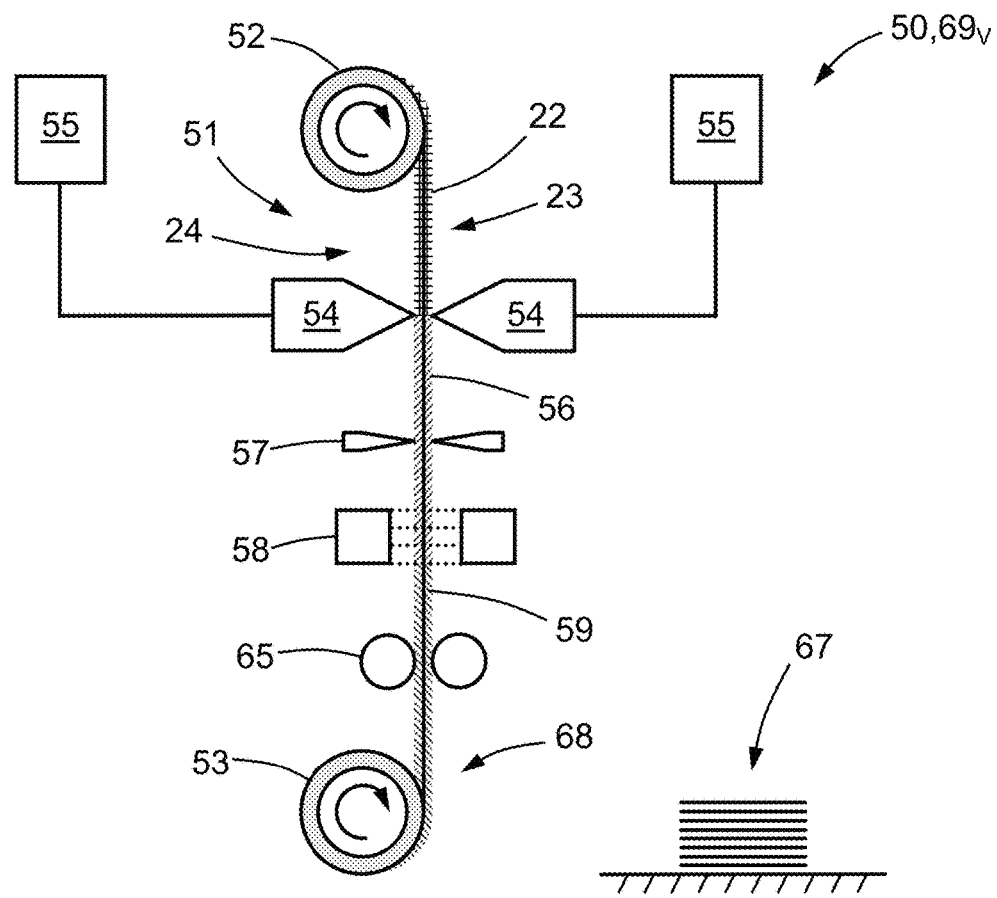
FIG. 9 is a schematic side view of the first system for manufacturing an electrode structure in a vertical orientation.
Figure 10:
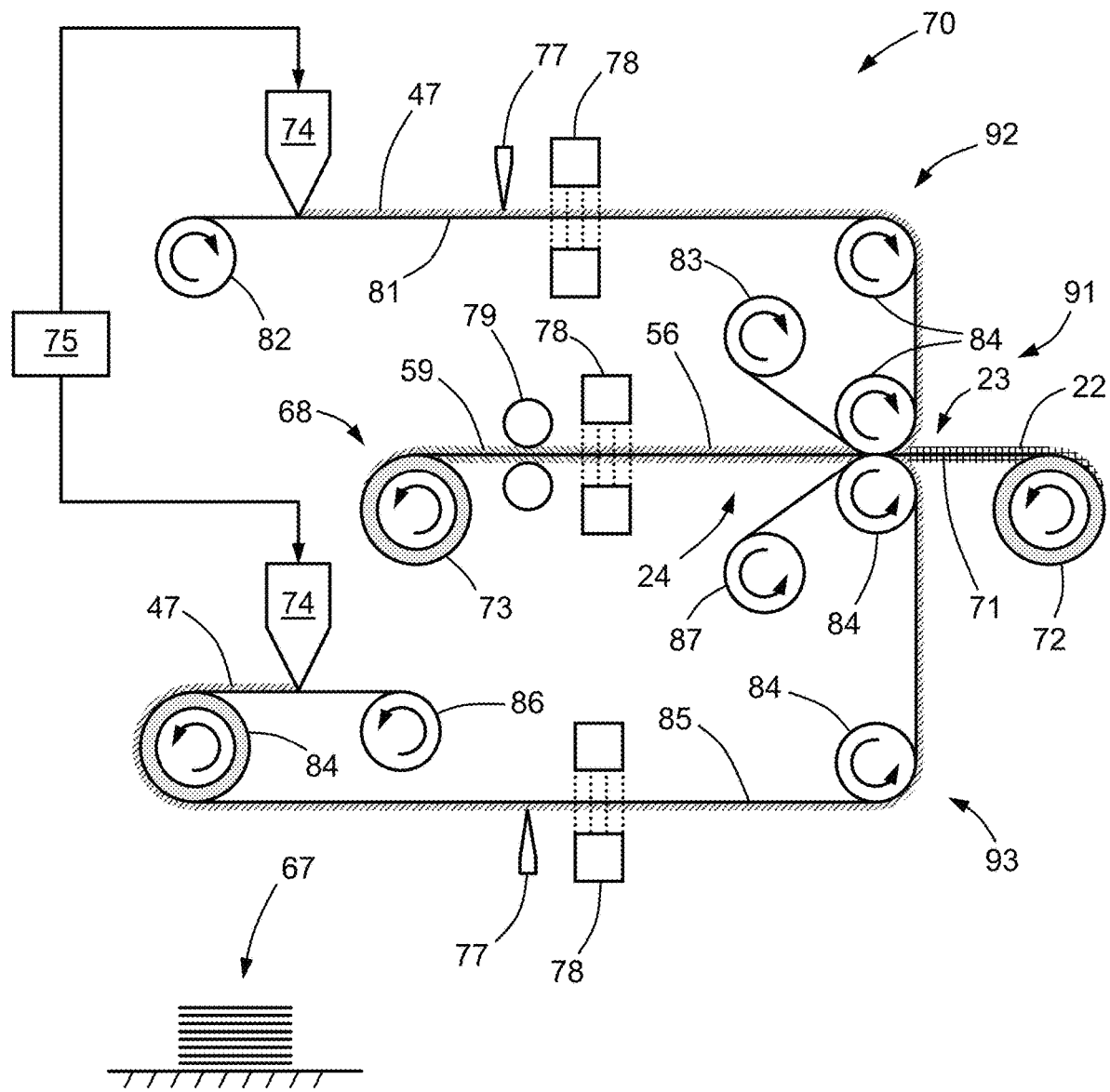
FIG. 10 is a schematic side view of a second system for manufacturing an electrode structure.
Figure 16:
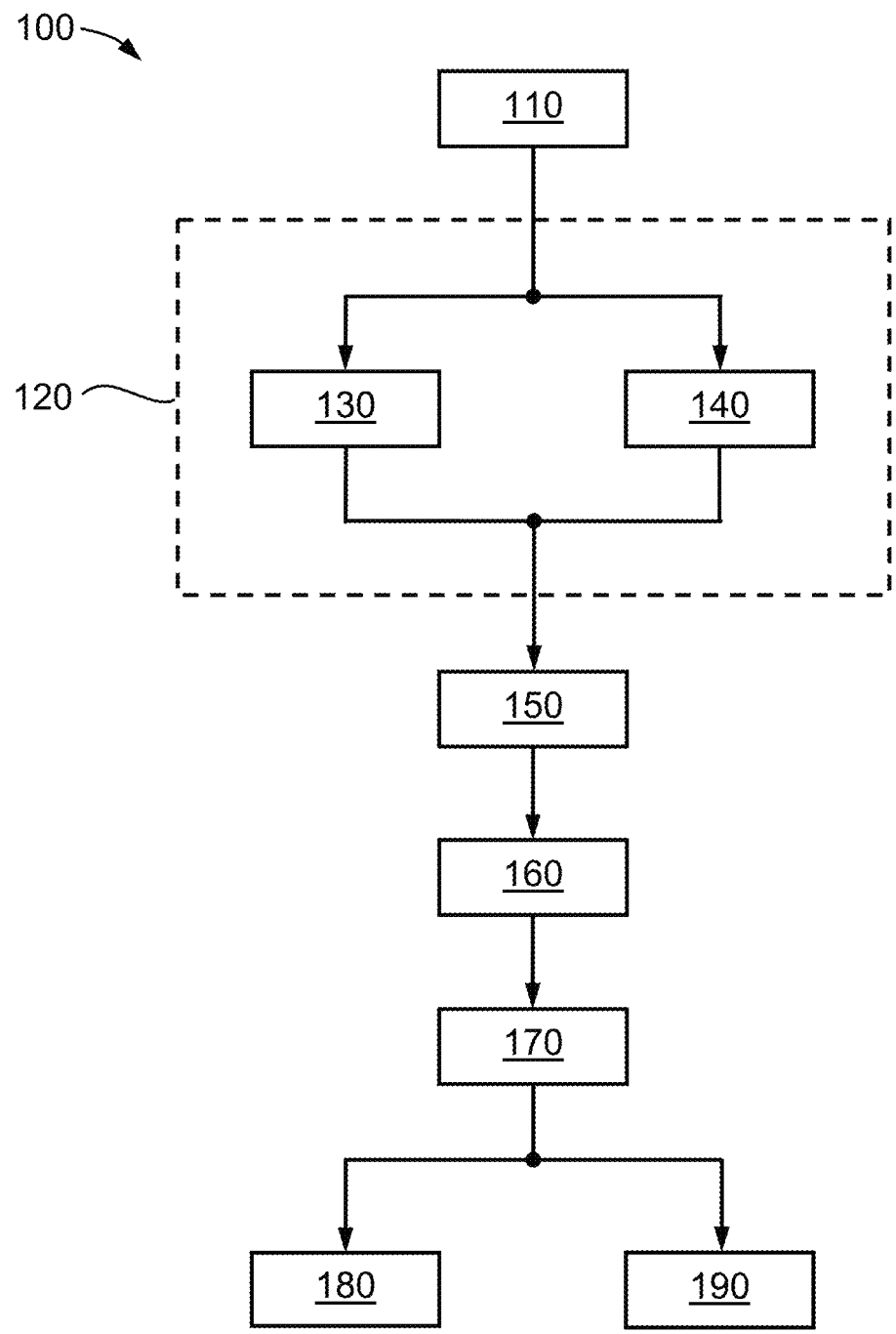
FIG. 16 is a flowchart for a method of manufacturing the electrode structure.

FIGS. 8 and 9 show schematic views of a first system 50 for manufacturing an electrode structure 20 in horizontal and vertical orientations $69_H$, $69_V$, respectively, and FIG. 10 shows a schematic flow diagram of a second system 70 for manufacturing an electrode structure 20. Relatedly, FIG. 16 shows a flowchart for a method 100 of manufacturing the electrode structure 20 using either of the first and second systems 50, 70.

The first system 50 shown in FIG. 8 is disposed in a horizontal orientation $69_H$ and includes a conveyor or conveyor path 51 on which bare perforated mesh 22 may be placed. The conveyor 51 may include a feed roller 52 and a take-up roller 53. The process of using the first system 50 may include having the bare perforated mesh 22 rolled up on the feed roller 52, with the bare perforated mesh 22 then being fed onto the horizontal conveyor 51; alternatively, the bare perforated mesh 22 may be fed onto the conveyor 51 manually. The bare mesh 22 is fed past one or more dispensers 54 for dispensing, depositing, spraying or expressing electrode material 47 onto the bare mesh 22 in the form of a slurry or paste. Each dispenser 54 may have its own reservoir 55 for containing the electrode material 47, or multiple dispensers 54 may be connected to and share a common reservoir 55. In FIG. 8, only one dispenser 54 is shown. In this configuration, the electrode material 47 may be sprayed, expressed, etc. onto the top surface 23 of the bare mesh 22 so as to form a top layer 46 of the electrode material 47 in its uncured form, and the electrode material 47 may seep, flow or be urged through the perforations 26 in the bare sheet 22, so as to form the bottom layer 48 of electrode material 47 on the bottom surface 24 of the bare sheet 22. In this way, a continuous sheet of coated mesh 56 is created, which has top and bottom layers 46, 48 of uncured electrode material 47 on the top and bottom surfaces 23, 24.

Next, the conveyor 51 moves the continuous sheet of coated mesh 56 past a spreader or doctor blade 57 located on the top and bottom sides of the sheet 56, which serves to provide a uniform "wet" thickness of uncured electrode material 47 on both sides. Then, the continuous sheet of uniformly coated mesh 56 moves past an oven or curing device 58 which cures the electrode material 47 on both sides of the sheet 56, thereby providing a continuous sheet of cured electrode structure 59. As shown in FIG. 14, the oven or curing source 58 may utilize heat 60, electromagnetic radiation 61 (such as infrared radiation 62 or ultraviolet radiation 63) and/or convection 64 (e.g., heated, forced air or gas) to cure the electrode material 47. After curing, the sheet of cured electrode structure 59 may optionally be calendared using calendaring rolls 65 to provide a uniform "dry" thickness of the cured electrode material 47, and then the sheet 59 may be cut into predetermined sized cut sheets 67 or rolled into rolls or coils 68.

The first system 50 shown in FIG. 9 is disposed in a vertical orientation $69_V$ and contains essentially the same equipment and flow sequence as the horizontally oriented system shown in FIG. 8, except that in FIG. 9 there are two dispensers 54 and reservoirs 55, with one dispenser 54 and reservoir 55 on each side of the continuous sheet.

FIG. 10 shows a schematic side view of a second system 70 for manufacturing an electrode structure 20. Whereas the first system 50 of FIGS. 8-9 utilizes one or more dispensers 54 to apply the electrode material 47 to one or both sides of the perforated mesh 22, the second system of FIG. 10 utilizes two decal transfer backings or backer sheets 81, 85 disposed on either side of the continuous sheet to transfer the electrode material 47 onto the perforated mesh 22.

As shown in FIG. 10, the second system 70 utilizes three conveyor paths. A first conveyor path 91 includes a first conveyor or conveyor path 71 extending from a bare mesh feed roll 72 to a cured electrode structure take-up roll 73. A second conveyor path 92 extends from a first backer feed roll 82 to a first backer take-up roll 83 and may include one or more idler rolls 84 therebetween. And a third conveyor path 93 extends from a second backer feed roll 86 to a second backer take-up roll 87 and may include one or more idler rolls 84 therebetween. Note that the idler rolls 84 that engage the mesh 22 may be different from those which do not engage the mess 22, in that the mesh-engaging idler rolls provide pressure to the backer sheets 81, 85 and the mesh 22 in order to effect transfer of the electrode material 47 from the backer sheets 81, 85 to the mesh 22. These mesh-engaging idler rolls may optionally simultaneously impart the desired electrode porosity in a calendaring step.

A bare perforated mesh 22 is unrolled from the bare mesh feed roll 72 and extends along the first conveyor path 91 (and optionally along a first conveyor 71) to the cured electrode structure take-up roll 73. At the same time, a first decal transfer backing or backer sheet 81 is unrolled from the first backer feed roll 82 and extends along the second conveyor path 91 to the first backer take-up roll 83 where it is then rolled up. Similarly, a second decal transfer backing or backer sheet 85 is unrolled from the second backer feed roll 86 and extends along the second conveyor path 91 to the first backer take-up roll 83 where it is then rolled up. (Optionally, rather than the backer sheets 81, 85 being unrolled from their respective feed rolls 82, 86 and being rolled up by their respective take-up rolls 83, 87, the backer sheets 81, 85 may instead circulate in a continuous manner or "loop" around their respective feed rolls 82, 86 and take-up rolls 83, 87. In this continuously circulating arrangement, the feed rolls 82, 86 and/or the take-up rolls 83, 87 may serve as "drive" rolls which propels the backer sheets 81, 85 around their respective loops, and the second and third conveyor paths 92, 93 may follow these respective loops.)

While the bare perforated mesh 22 is being fed along the first conveyor path 91 and the backer sheets 81, 85 are being fed along the second and third conveyor paths 92, 93, respectively, the dispensers 74 deposit electrode material 47 onto the backer sheets 81, 85. The dispensers 74 may have their own internal reservoirs of electrode material 47, or they may be fed by one or more external reservoirs 75 that contain the electrode material 47. As the backer sheets 81, 85 move downstream past their respective dispensers 74, the backer sheets 81, 85 carry a continuous deposition of electrode material 47 thereon. Each backer sheet 81, 85 may then pass through a respective spreader or doctor blade 77 to provide a uniform "wet" thickness of electrode material 47 on the backer sheet 81, 85, and then rough a respective oven or curing device 78 to partially cure the electrode material 47 thereon. As shown in FIG. 10, the three conveyor paths 91, 92, 93 may be arranged such that they meet at a three-way meeting point with the first decal transfer backing or backer sheet 81 facing the top surface 23 of the perforated mesh 22 and the second decal transfer backing or backer sheet 85 facing the bottom surface 24 of the perforated mesh 22, such that the electrode material 47 carried by the two backer sheets 81, 85 is transferred onto the top and bottom surfaces 23, 24 of the perforated mesh 22, thereby forming a sheet of coated mesh 56 (i.e., perforated mesh 22 coated with partially cured electrode material 47) which continues downstream from the three-way meeting point.

Continuing downstream along the first conveyor path 91 (which flows from right to left in FIG. 10), the coated mesh 56 passes through an oven or final curing device 78 similar to the one used in the first system 50. After passing through the oven or curing device 78, the electrode material 47 on the coated mesh 56 is cured and the coated mesh 56 becomes a sheet of cured electrode structure 59, which then passes through calendaring rolls 79 which provide a uniform "dry" thickness to each side. Finally, the sheet of cured electrode structure may be rolled up into a roll or coil 68 around the cured electrode structure take-up roll 73, or it may be cut up into predetermined sized cut sheets 67.

It may be noted that in both the first and second systems 50, 70 above, each instance of "conveyor" 51, 71 or "conveyor path" 91, 92, 93 may represent a physical conveyor (e.g., a belt conveyor) on which or against which the continuous sheet may travel or may be fed, or each instance may represent a path of conveyance along which the continuous sheet may travel or may be fed. Also, as used herein, the phrase "continuous sheet" means a continuous sheet of material(s) which at various points along the flow path may be a span of bare perforated mesh 22, a span of coated mesh 56 (i.e., perforated mesh 22 coated with uncured electrode material 47) or a span of cured electrode structure 59 (i.e., perforated mesh 22 coated with cured electrode material 47).

FIG. 16 shows a flowchart for a method 100 of manufacturing the electrode structure 20, such as for a battery. At block 110, a layer 21 of electrically conductive perforated mesh 22 is provided having a top surface 23, a bottom surface 24, a plurality of interconnected electrically conductive segments 25 and a plurality of perforations 26 among adjacent ones of the interconnected electrically conductive segments 25. At block 120 (represented by the dashed rectangle), a top layer 46 and a bottom layer 48 of electrode material 47 is applied to the top and bottom surfaces 23, 24, respectively, such that the top and bottom layers 46, 48 are in physical contact with each other through the plurality of perforations 26 in the perforated mesh 22. And at block 160, the top and bottom layers 46, 48 of electrode material 47 are cured (either fully or partially) using one or more of heat 60, electromagnetic radiation 61 and convection 64 to produce a sheet of cured electrode structure 59.

Note that block 120 (represented by the dashed rectangle) includes one branch containing block 130 and another branch containing block 140. At block 130, the electrode material 47 may be applied to the perforated mesh 22 as a slurry or paste which is either sprayed, expressed or otherwise deposited onto the perforated mesh 22 by one or more dispensers 54, 74 facing one or both of the top and bottom surfaces 23, 24, as illustrated by FIGS. 8-9. And at block 140, the electrode material 47 may be transferred onto the perforated mesh 22 by a first decal transfer backing 81 carrying electrode material 47 and facing the top surface 23, and by a second decal transfer backing 85 carrying electrode material 47 and facing the bottom surface 24, as illustrated by FIG. 10.

In this method 100, the top and bottom layers 46, 48 of electrode material 47 may be applied generally simultaneously as a single step. As illustrated in FIG. 8, the electrode material 47 may be applied to only one of the top and bottom surfaces 23, 24 to form the respective top or bottom layer 46, 48, and the electrode material 47 may flow through the perforations 26 to the other of the top and bottom surfaces 23, 24 to form the respective bottom or top layer 48, 46. Or, as illustrated in FIGS. 9 and 10, the electrode material 47 may be applied to both of the top and bottom surfaces 23, 24.

The method 100 may further include, at block 150, spreading the electrode material 47 in slurry or paste form on at least one of the top and bottom surfaces 23, 24 so as to achieve a predetermined "wet" thickness of the electrode material 47 on the top and bottom surfaces 23, 24. Also, the perforated mesh 22 may be disposed in either a horizontal orientation $69_H$ or a vertical orientation $69_V$ for the applying and curing steps of blocks 120 and 160. The method 100 may further include, at block 180, cutting the sheet of cured electrode structure 59 into predetermined sized cut sheets 67, or, at block 190, rolling the sheet of cured electrode structure 59 into a roll or coil 68. Optionally, at block 170, the sheet of cured electrode structure 59 may be calendared to provide a uniform "dry" thickness of the electrode material 47 in the top and bottom layers 46, 48.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An electrode structure for a battery, comprising:
   a middle layer made of an electrically conductive perforated mesh having a top surface, a bottom surface, a plurality of interconnected electrically conductive segments and a plurality of perforations among adjacent ones of the interconnected electrically conductive segments;
   a top layer of an electrode material disposed on the top surface; and
   a bottom layer of the electrode material disposed on the bottom surface,
   wherein the top layer and the bottom layer are disposed in physical contact with each other through the plurality of perforations in the middle layer,
   wherein the perforated mesh is a 3D-printed mesh of an electrically non-conductive material onto which an electrically conductive second material has been electrodeposited.

2. The electrode structure of claim 1, wherein the electrically conductive perforated mesh is made of steel, stainless steel, copper, aluminum or titanium.

3. The electrode structure of claim 1, wherein the electrode material is a cured initially thixotropic slurry or paste.

4. The electrode structure of claim 1, wherein the electrode structure forms an anode or a cathode.

5. The electrode structure of claim 4, wherein if the electrode structure forms an anode then the electrode material contains at least one of graphite, silicon, silicon oxide, lithiated silicon and lithiated silicon oxide, and if the electrode structure forms a cathode then the electrode material contains at least one of a layered transition metal oxide, an olivine and a spinel.

6. The electrode structure of claim 1, wherein the top and bottom layers of electrode material form a bounded shape and at least one portion of the middle layer of perforated mesh extends outside the bounded shape.

7. The electrode structure of claim 6, wherein the bounded shape is one of a generally flat rectangular prism and a generally flat disc.

8. The electrode structure of claim 1, wherein the top and bottom layers of electrode material form a bounded shape and the middle layer of perforated mesh does not extend outside the bounded shape.

9. The electrode structure of claim 1, wherein the perforated mesh is between 10 and 500 microns in thickness, and wherein each of the top and bottom layers of electrode material is between 40 and 200 microns in thickness if the electrode structure is formed as an anode and between 100 and 400 microns in thickness if the electrode structure is formed as a cathode.

10. A battery electrode, comprising:
    a middle layer made of an electrically conductive perforated mesh having a top surface, a bottom surface, a plurality of interconnected electrically conductive segments and a plurality of perforations among adjacent ones of the interconnected electrically conductive segments;

a top layer of an electrode material disposed on the top surface, wherein the electrode material is a cured initially thixotropic slurry or paste containing at least one of graphite, silicon, silicon oxide, lithiated silicon and lithiated silicon oxide if the battery electrode is formed as an anode, or at least one of a layered transition metal oxide, an olivine and a spinel if the battery electrode is formed as a cathode; and a bottom layer of the electrode material disposed on the bottom surface, wherein the top and bottom layers are disposed in physical contact with each other through the plurality of perforations in the middle layer, wherein the perforated mesh is a 3D-printed mesh of an electrically non-conductive material onto which an electrically conductive second material has been electrodeposited, wherein the second material is made of steel, stainless steel, copper, aluminum or titanium.

11. A method of manufacturing an electrode structure for a battery, comprising:

3D-printing a layer of electrically non-conductive perforated mesh having a top surface, a bottom surface, a plurality of interconnected segments and a plurality of perforations among adjacent ones of the interconnected segments;

electrodepositing a conductive material onto the non-conductive perforated mesh such that its segments are electrically conductive;

applying a top layer and a bottom layer of electrode material to the top and bottom surfaces, respectively, such that the top and bottom layers are in physical contact with each other through the plurality of perforations in the perforated mesh; and curing the top and bottom layers of electrode material using one or more of heat, electromagnetic radiation and convection to produce a sheet of cured electrode structure.

12. The method of claim 11, wherein the top and bottom layers of electrode material are applied generally simultaneously as a single step.

13. The method of claim 11, wherein the electromagnetic radiation includes one or more of infrared radiation and ultraviolet radiation.

14. The method of claim 11, wherein the electrode material is applied to only one of the top and bottom surfaces to form the respective top or bottom layer, and the electrode material flows through the perforations to the other of the top and bottom surfaces to form the respective bottom or top layer.

15. The method of claim 11, wherein the electrode material is applied to the layer of perforated mesh as a slurry or paste which is either:

sprayed or expressed onto the layer of perforated mesh by one or more dispensers facing one or both of the top and bottom surfaces; or transferred onto the layer of perforated mesh by a first decal transfer backing facing the top surface and a second decal transfer backing facing the bottom surface.

16. The method of claim 11, further comprising:

spreading the electrode material on at least one of the top and bottom surfaces so as to achieve a predetermined thickness of the electrode material on the at least one of the top and bottom surfaces.

17. The method of claim 11, wherein the layer of perforated mesh is disposed in either a horizontal orientation or a vertical orientation for the applying and curing steps.

18. The method of claim 11, further comprising:

cutting the sheet of cured electrode structure into predetermined sized cut sheets.

19. The method of claim 11, further comprising:

rolling the sheet of cured electrode structure into a coil.

* * * * *